Dec. 2, 1969    M. BLAGOJEVICH    3,481,373
SELF-ENERGIZED TOOL FOR CRIMPING CONNECTION FITTINGS ABOUT
ELECTRICAL CONDUCTOR LINES
Filed Oct. 16, 1967    4 Sheets-Sheet 1
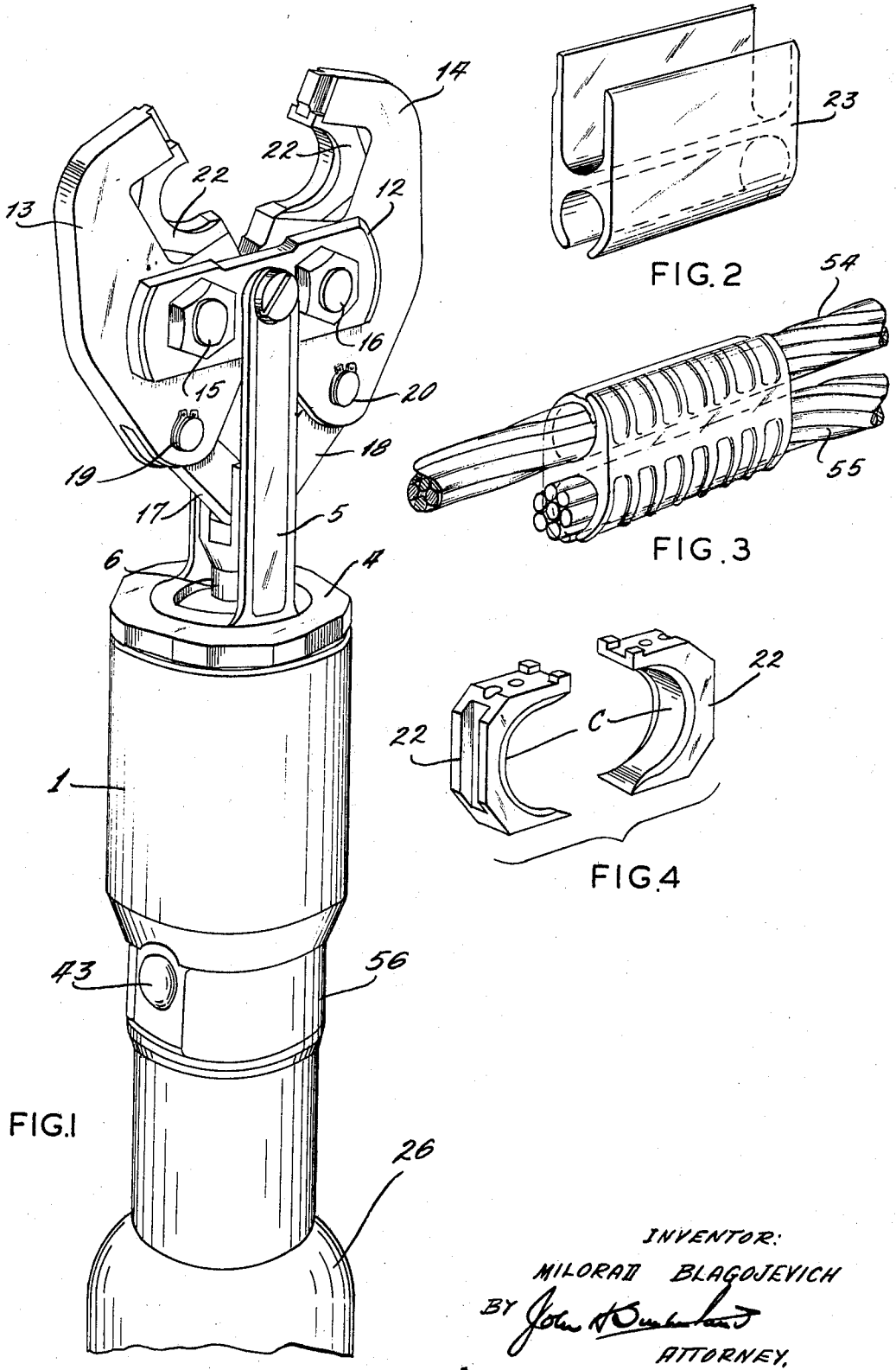
INVENTOR:
MILORAD BLAGOJEVICH
BY John H Bushland
ATTORNEY.

Dec. 2, 1969  M. BLAGOJEVICH  3,481,373
SELF-ENERGIZED TOOL FOR CRIMPING CONNECTION FITTINGS ABOUT
ELECTRICAL CONDUCTOR LINES
Filed Oct. 16, 1967  4 Sheets-Sheet 2

INVENTOR:
MILORAD BLAGOJEVICH
BY
ATTORNEY.

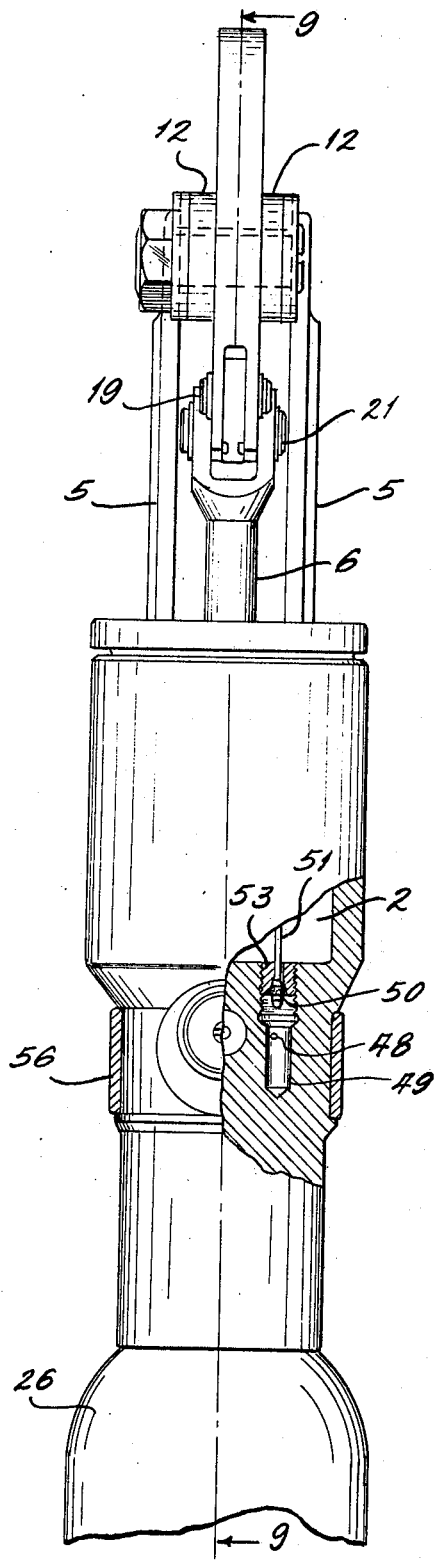
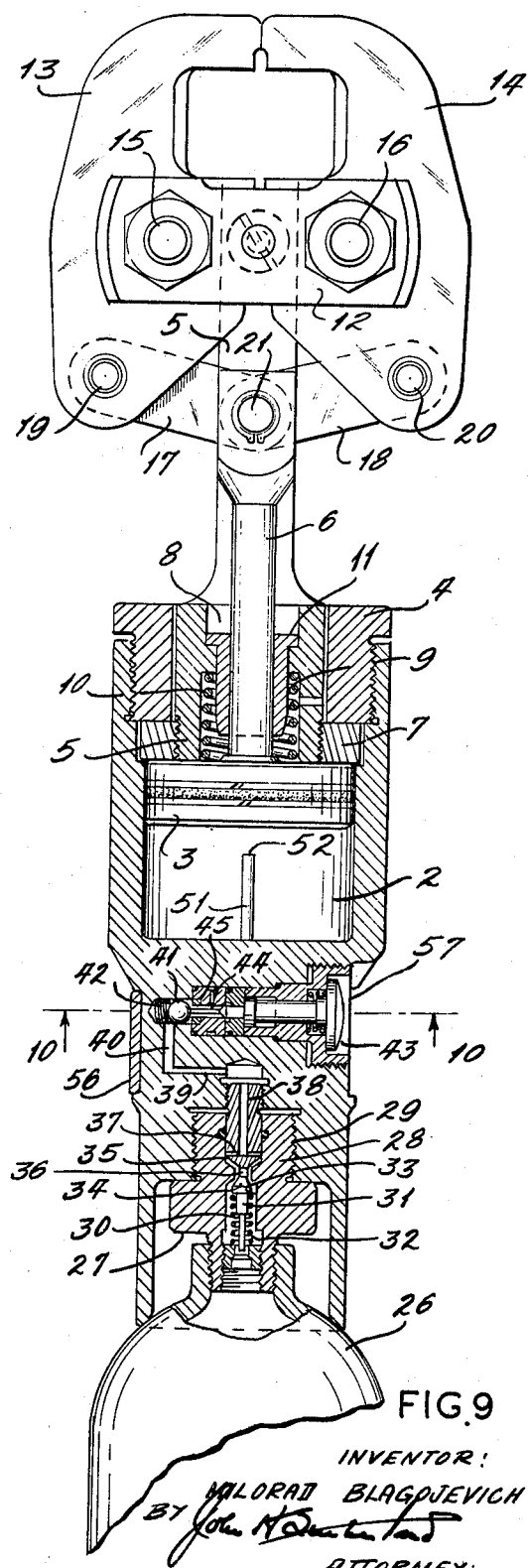
FIG.8
FIG.9

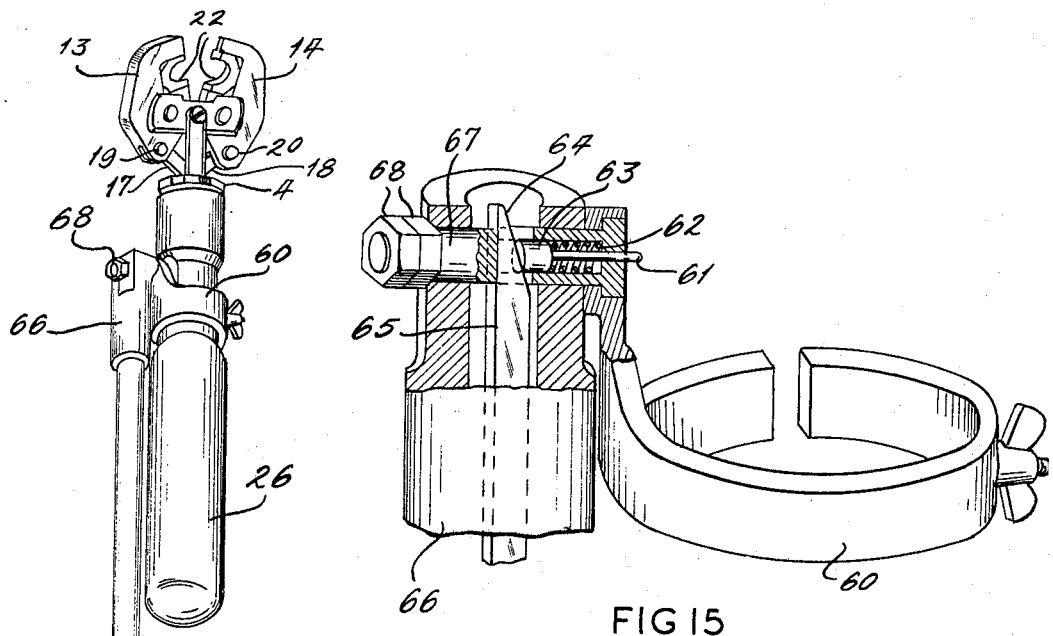
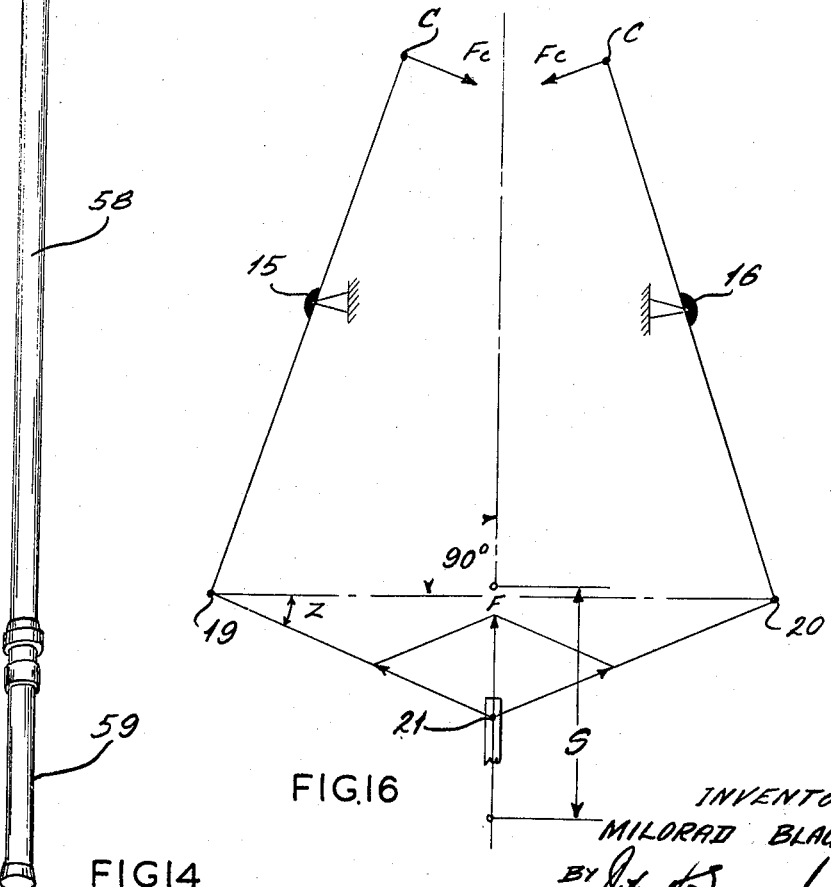
FIG.14　　FIG.15　　FIG.16
INVENTOR:
MILORAD BLAGOJEVICH
BY
ATTORNEY.

United States Patent Office
3,481,373
Patented Dec. 2, 1969

3,481,373
SELF-ENERGIZED TOOL FOR CRIMPING CONNECTION FITTINGS ABOUT ELECTRICAL CONDUCTOR LINES
Milorad Blagojevich, St. Louis, Mo., assignor to Kearney-National Inc., St. Louis, Mo., a corporation of Delaware
Filed Oct. 16, 1967, Ser. No. 675,480
Int. Cl. B21f 15/02
U.S. Cl. 140—113    10 Claims

ABSTRACT OF THE DISCLOSURE

Self-energized tool for compressing ductile fittings about electrical conductors. The tool has a piston-cylinder combination wherein the piston is moved in its power stroke by the admission of compressed gas, such as nitrogen, from a supply, and the flow of gas from the supply is controlled manually for admission and automatically for interruption so as to cut off the supply before the piston has reached the end of its power stroke. After the supply is interrupted, the piston continues to move under diminishing cylinder pressure while mechanical advantage means multiplies the diminishing force of the piston to provide an increasing force on the fitting.

---

The invention relates to portable tools for crimping ductile connection fittings about electrical conductor lines, and particularly to such a tool which is energized by compressed gas.

Such tools energized by compressed carbon dioxide have heretofore been provided, but they are subject to various objections from the practical point of view. Such ductile fittings are industrially used in a variety of sizes, shapes, and of different metals. The force required to properly crimp the larger of them about electrical conductors may reach the magnitude of many tons. Force output of that magnitude can be attained very few times from a canister of unliquified carbon dioxide gas, affixed to a tool, light enough in weight to be manipulated, accordantly, by a workman ensconced upon a utility pole, or in other precarious positions. Consistent with portability, in order to achieve the energy output required for the duration of a not uncommon trip up the pole (which usually involves twenty or more operations of the tool), the carbon dioxide has to be liquified. Liquification permits the transportation of a given volume of available gas in a smaller space, but introduces a certain awkwardness into manipulation of the tool. The very presence of a body of liquid, integrated with the tool, shifts its balance with every movement. Moreover, the presence of a body of liquid carbon dioxide precludes use of the tool save in orientations where gravity does not impel the liquid into the operating mechanism of the tool with consequent freezing of the operating parts.

Furthermore, the presence of liquid carbon dioxide imposes a limitation upon the ambient temperature range within which the tool can be safely and effectively used. Within the range of the temperature (—30° to 120° F.) ambient to use in many cases, a confined body of carbon dioxide, liquid and gas in equilibrium, undergoes some change of state with every change in temperature. This increases the pressure when the temperature rises, and at the higher levels may produce a hazardous condition. Conversely, it decreases the pressure when the temperature declines, and at the lower levels results in the canister pressure being insufficient to do the required work. Furthermore, the recharging of canisters with liquid carbon dioxide involves tedia and complexities which, in the practical sense, precludes such refilling in the field.

The above-mentioned carbon dioxide energized tool is unnecessarily wasteful of the energizing gas. It is so organized that the closure valve at the mouth of its canister is opened and closed manually to control the flow of pressurized fluid to a substantially distant piston-cylinder combination which produces the forced motion necessary to deliver the maximum force required to accomplish the work. Consequently, upon the completion of each power stroke of the piston, all gas contained within the tool per se (as distinguished from the annexed canister) is released to the atmosphere as waste.

The object of the invention is therefore to provide such a tool which is free of all the aforesaid disadvantages.

This objective is achieved in accordance with the present invention, which is predicated upon the discovery that a supply of energizing fluid ample for normal use of such a tool, under all practical circumambient temperatures, can be supplied, to the piston-cylinder combination thereof, by a canister of practical size (such as one having a capacity of about fifty cubic inches of water) charged with a wholly gaseous fluid, such as nitrogen. Nitrogen is free of tendency to change state at temperatures within the range expected for operation of the tool. Furthermore, the fact that nitrogen (unlike carbon dioxide) behaves approximately in accordance with Boyle's Law makes its performance more dependable than that of carbon dioxide under the vagarious conditions ambient to the point of use.

To compensate for the lesser magnitude of energy storable, per unit of volume, in the gaseous state (in contrast with the liquid state), the invention further contemplates means for economizing the consumption of such gas during each individual operating stroke of the tool. There are two aspects of this. First, it involves automatically interrupting the inflow of energizing gas to the expansion chamber of the piston-cylinder combination before the end of its power stroke; and so organizing mechanical advantage means between the piston and the work that after the inflow of gas into the expansion chamber has been stopped, and at the very time that the maximum force is frequently required to complete the work, declining pressure on the piston is made to produce the increasing force required to complete the crimp. Secondly, the invention contemplates minimizing the space occupied by the gas which is wasted upon the completion of each power stroke. The latter is achieved by providing a manually operated control valve as close as may be to the cylinder, and by arranging the connection between the canister and the tool proper so that the closure valve at the canister mouth is permanently open while the canister is mechanically annexed to the tool.

An illustrative embodiment of the invention is shown in the accompanying drawings, in which:

FIGURE 1 is a perspective view of the tool of the invention with gas canister annexed;

FIGURE 2 is a perspective view of the largest size connection fitting adapted to be crimped by the tool shown in FIGURE 1;

FIGURE 3 is a perspective view of the fitting shown in FIGURE 2 after being crimped about electrical conductors;

FIGURE 4 is a perspective view of a pair of removable dies usable in the tool of the invention to crimp the connector shown in FIGURE 2 about conductors to produce the connection shown in FIGURE 3;

FIGURE 8 is a side elevation of the tool shown in

Figure 10:
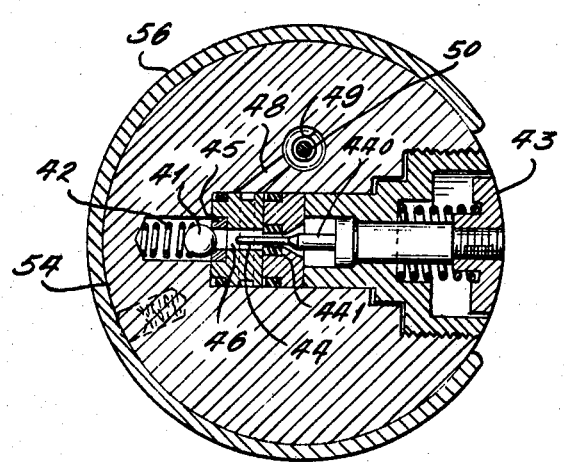
Figure 11:
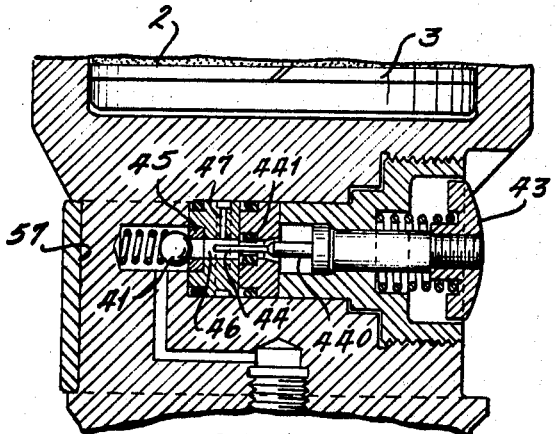
Figure 12:
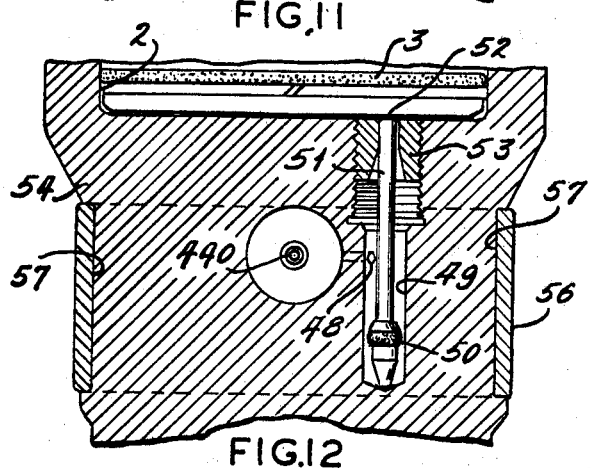
Figure 13:
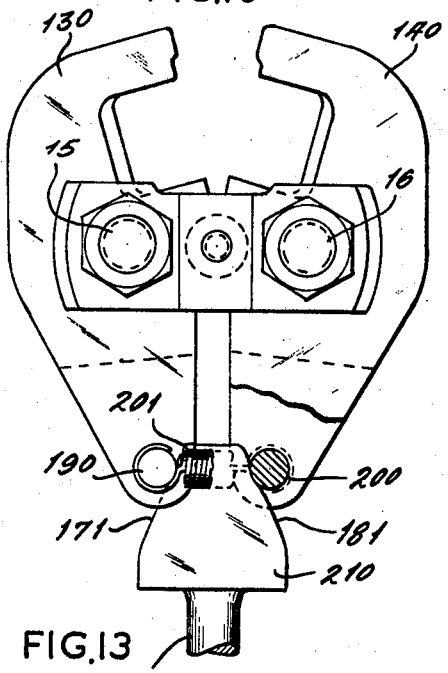

FIGURE 1, with part broken away to reveal the relationship of an automatic valve within the tool, said valve being shown in its closed position;

FIGURE 9 is a sectional view taken along line 9—9 of FIGURE 8, and showing a manually operable valve in the position occupied by it when the cylinder of the tool is being charged with pressurized gas;

FIGURE 10 is a sectional view taken along line 10—10 of FIGURE 9, but showing the manually operable valve in the position occupied by it to exhaust gas from the cylinder of the tool;

FIGURE 11 is a sectional view corresponding to FIGURE, 9, but showing the manually operable valve in the position occupied by it to exhaust gas from the cylinder of the tool;

FIGURE 12 is a sectional view corresponding to the portion shown in section in FIGURE 8, but showing the automatic valve in its open position;

FIGURE 13 is a view in side elevation of an alternative form of mechanical advantage means suitable for embodiment in the tool;

FIGURE 14 is a perspective view of the tool shown in FIGURE 1, mounted upon an appropriate hot stick;

FIGURE 15 is a perspective view, partially in section, showing the internal mechanism of the hot stick which actuates the manually operable valve of the tool; and FIGURE 16 is a force diagram of the mechanical advantage means embodied in the tool as shown in FIGURES 1 and 9.

In the form illustrated in FIGURE 1, the tool comprises a body 1 having a central cylindrical section defining a cylinder 2, as seen in FIGURE 9, which accommodates a piston 3 (FIGURE 9). The upper end of the body 1 is internally threaded to receive a cap nut 4, which retains a yoke 5 in the body 1 with freedom for rotation about the axis of the body. As seen in FIGURE 1, the bifurcated portion of yoke 5, as well as piston rod 6, project upward through a central opening in cap nut 4. As shown in FIGURES 8 and 9, the yoke 5 is held within body 1 by threaded connection with a flange nut 7, but it will be understood that the flange provided by flange nut 7 may, if desired, be formed integrally with the yoke 5. The flange nut 7 has sufficient clearance, radially and axially, with body 1 to permit its rotation about the axis of the body, and by virtue of the threaded (or integral) connection between the flange nut and the yoke 5, the two move as one.

The portion of the yoke 5 which extends within body 1 is provided with a central bore 8 which accommodates piston rod 6. The bore 8 has a portion of reduced diameter which provides a seat 9 for one end of a coil spring 10, the other end of which bears against piston 3, as shown clearly in FIGURE 9, to constantly bias the piston toward the retracted position shown in FIGURES 11 and 12. The spring 10 is of a character such that it continues to exert enough force to drive the piston 3 into the retracted position and hold it in that position while idle. At the same time, the spring 10 biases the yoke 5 and flange nut 7 in the opposite direction, thereby maintaining the flange nut seated against the lower face of cap nut 4 at all times. A sleeve bearing 11 embraces the piston rod 6 and is seated within spring 10.

The upper extremities of the bifurcated portion of yoke 5 provide a mounting for a pair of plates 12, between which a pair of jaws 13 and 14 are pivotally mounted upon bolts 15 and 16, respectively, all in accordance with the usual practice in tools of this type which are manually operated. The lower (as seen in FIGURE 1) ends of the jaws 13 and 14 are respectively hinged to toggle links 17 and 18 through pins 19 and 20, and the toggle links have a common fulcrum 21 with the upper end of piston rod 6. The toggle links 17 and 18 are of equal length, and the distance between the hinge centers 15 and 19 is the same as the distance between the hinge centers 16 and 20; and in the embodiment shown in the drawings, the distance 15–19 and 16–20 is the same as the distance 19–21 and 20–21.

At their ends remote from the toggle links, the respective jaws 13 and 14 have a space designed to receive any of a variety of die parts, such as 22, as is conventional with hand-operated tools of this type.

Figure 5:
FIGURE 5 is a perspective view of the smallest size fitting adapted for use with the tool shown in FIGURE 1.
Figure 7:
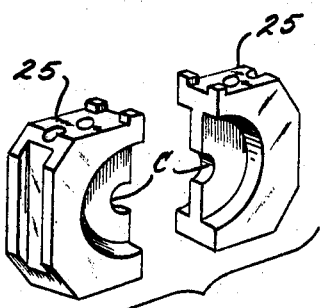
FIGURE 7 is a view corresponding to FIGURE 4, but showing the die pair utilized in crimping the connector shown in FIGURE 5 to form the connection shown in FIGURE 6.

The pair of die parts shown in FIGURE 1 is identical with the pair shown in FIGURE 4, and have their concave surfaces proportioned to accommodate and operate upon an extruded aluminum fitting 23, shown in FIGURE 2, which is illustrative of the largest size connection fitting for which the particular tool shown in the drawings is designed to accommodate. On the other hand, the smallest size fitting which the tool shown in the drawings is designed to accommodate is illustrated in FIGURE 5, and consists of an aluminum sleeve 24. In forming an electrical connection with the latter, the dies 22, shown in FIGURES 1 and 4, are removed from the tool and replaced with a pair of dies 25, 25, shown in FIGURE 7. It will be observed that the exterior configuration of the die pairs 22 and 25 is identical so that they can be readily substituted for each other in the spaces provided therefor in jaws 13 and 14. On the other hand, the internal configuration of the jaw pairs 22 and 25 is designed and proportioned to accomplish the desired crimp upon fittings of the size and type 23 and 24, respectively, which is in accordance with the usual practice in manually operable tools of this type. As is conventional with hand-operated tools, each individual die part, whether of pair 22 or of pair 25, has an arcuate concavity within which is a central ridge whose radius is less midway between the flat sides of that die part than sidewardly thereof. At the mid-point of the arc which defines the back of said ridge, there is a point C, hereinafter referred to, which is the force center for that die part.

As shown in FIGURES 1, 8 and 9, the lower (as seen in FIGURE 1) end of the tool is equipped with a canister 26 charged with compressed gas, which is preferably nitrogen at a pressure of 100–200 atmospheres. The mouth of the canister 26 is provided with a fitting 27, having a threaded neck 28 screw-threaded into a recess 29 in the end of body 1 opposite yoke 5. The fitting 27 has a central bore 30 within which is accommodated a valve stem 31, biased by a spring 32 in the direction which tends to drive a seal member 33 against a conical seat 34. Thus, the static pressure of the gas within canister 26 also tends to drive the seal 33 into closed position. Consistent with the usual safety practices, the canister 26 may be equipped with a relief valve which opens to vent the canister in response to unsafely high pressure within it. Such a relief valve may conveniently be incorporated in the fitting 27 with communication to the bore 30 thereof, and may be as simple as a disc calibrated to rupture at a predetermined, abnormally high pressure.

The valve 31–32–33–34 is shown in its open position in FIGURE 9, and it is held open by engagement with the end of plug 35, which is permanently affixed to the body 1 so as to project into the threaded recess 29. Accordingly, when the canister 26 is screwed into recess 29, plug 35 engages a pilot 36 of the canister valve and presses it against the reaction of spring 32 and the static pressure within the canister into the open position shown. The canister valve remains in this open position as long as the canister is affixed to the tool.

The plug 35 has its nose so contoured with respect to the cavity of fitting 27 into which it is received that gas may pass about the nose of plug 35, and into passageways 37, thence into passageways 38, 39 and 40, until it encounters a spring-biased ball valve 41, which is normally closed, as shown in FIGURE 11, and constantly biased into its closed position not only by the pressure of the gas behind it, but also by spring 42.

When it is desired to admit the pressurized gas to cylinder 2, finger button 43 is pressed from the position shown in FIGURE 11 to the position shown in FIGURE 9. When the button is thus pressed, a pilot 44, which is normally in the position shown in FIGURE 11, is moved against ball 41, as shown in FIGURE 9, to dislodge ball 41 from its seat 45. Having thus opened the ball valve, gas is admitted through passageways 46, 47 to passageway 48, and into a sub-chamber 49 shown best in FIGURES 8, 10 and 12. The sub-chamber 49 has communication with cylinder 2, but such a communication is controlled by a differential valve having a head 50 and a stem 51. The stem 51 has an upper end 52, which is arranged to project into sealing contact with the face of piston 3 at least while the piston is in the early part of its power stroke when movement of the jaws 13 and 14 is being resisted by the work being done. When the ball valve 41 is closed, the piston 3 and the differential valve are in the position shown in FIGURE 12, with or without the end face 52 of stem 51 being in contact with the face of the piston, and with the head 50 resting against the bottom of sub-chamber 49. In this position, when ball valve 41 is opened, pressurized gas is admitted into sub-chamber 49, the gas is free to pass through the restricted opening between stem 51 and a sleeve 53 which serves to guide the stem 51 in its travel and also provides a seat against which head 50 will ultimately seal. At the same time, the pressurized gas is free to pass around valve-head 50 and exert presssure tending to force the valve 50–51 upwardly within subchamber 49. Regardless of whether the upper end 52 of stem 51 is in contact with the face of the piston, the gas pressure in sub-chamber 49 tends to move valve head 50 toward sleeve 53 following the movement of the piston during the power stroke thereof until head 50 comes into sealing relationship with sleeve 53, as shown in FIGURE 8. If the end 52 is not in face-to-face contact with the piston 3 when ball valve 41 is first opened, it soon will be, because the orifice provided between stem 51 and sleeve 53 is substantially smaller than that provided by passageway 48, and hence the pressure in the cylinder does not instantaneously equalize with the pressure in sub-chamber 49. During the brief period while the pressure in sub-chamber 49 exceeds the pressure in the cylinder, the parts 50, 51, 52 and 53 act as a differential pressure valve, and the parts 50, 51 and 52 outrun the piston until the end 52 is seated against the piston face. Thereupon, the parts 50 and 51 begin to act as a differential area valve. On the other hand, if the end 52 is in contact with the face of the piston while the latter is in its retracted position, the differential area valve action begins with the opening of valve 41, and the differential pressure valve action takes place concomitantly until the pressure in the cylinder has equalized with that in sub-chamber 49.

As previously pointed out, the invention contemplates that the sealing relationship between head 50 and sleeve 53 be caused to occur before piston 3 has reached the end of its power stroke. Thus, in the relationship shown in FIGURE 9, before the piston has reached the end of its power stroke, end 52 of stem 51 has been separated from the adjacent face of the piston and the piston has run away from it. When the head 50 is thus sealed against sleeve 53, the flow of pressurized gas from sub-chamber 49 into cylinder 2 is blocked regardless of the position of ball valve 41 or button 43. From the time the face of piston 3 separates itself from end 52 of stem 51, further movement of the piston in its power stroke is effectuated solely by expansion of the pressurized gas theretofore introduced into cylinder 2. In spite of the fact that the maximum force required to crimp a fitting, such as 23, about conductors 54 and 55 (see FIGURE 3) occurs after piston 3 has moved out of contact with end 52, and the pressure in cylinder 2 is thus declining, the mechanical advantage means (13–21) provides an increasing force on the dies, such as 22, as will be later explained.

Once the piston 3 has moved to the end of its power stroke to effect complete closing of jaws 13, 14 (a fact readily observable by the operator), button 43 may be released, whereupon it is spring-biased into the position shown in FIGURE 11. During such movement, pilot 44 releases ball 41 for movement to its closed position, and the large diameter portion 440 of pilot 44 breaks its seal with O-ring 441, so that the pressurized gas contained in channels 46, 47, 48, sub-chamber 49, and cylinder 2 may be exhausted past O-ring 441 and pilot 44, beyond which there is no seal to prevent its escape to the atmosphere either under its inherent pressure or under the bias of spring 10 driving piston 3 into its retracted position shown in FIGURE 12. Hence, the only pressurized gas wasted is that which was introduced into cylinder 2 prior to the closing of differential valve 50–51, and that which occupied the passageways 6, 47, 48 and sub-chamber 49.

Figure 6:
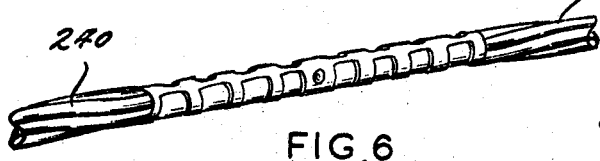
FIGURE 6 is a perspective view of the fitting shown in FIGURE 5 after being crimped about conductors to make a connection therebetween.

The space between end 52 of stem 51 and the adjacent face of piston 3, as shown in FIGURE 9, represents the position at which end 52 comes to rest for any operation of the tool, which requires no more force at dies 22 or 25 than that required to properly crimp fitting 23 to the condition shown in FIGURE 3. If the tool was not intended to be used in the crimping of fittings as large as that shown in FIGURE 2 about conductors which were the largest accommodatable by that fitting, the stem 51 could be foreshortened so that the space between end 52 and the adjacent face of piston 3, when the latter is at the end of its power stroke, would be greater than that shown in the drawings. Such foreshortening would result in still greater conservation of pressurized gas. For example, if the only job which the user intended to perform with the tool was the crimping of a sleeve 24 to connect conductors 240 and 241, as shown in FIGURE 6 using dies 25, the stem 51 could be foreshortened to where it extended a substantially lesser distance within cylinder 2 before head 50 seated against sleeve 53 to stop the further flow of pressurized gas into the cylinder.

To illustrate the opposite extreme, a conventional copper alloy fitting, which is of size intermediate those shown in FIGURES 2 and 5, requires greater force to finally conform it to the contour of its die pair than does the larger aluminum fitting shown in FIGURE 2. In the application of such a copper fitting with the tool of the invention, whose linkage system is shown diagrammatically in FIGURE 16, and wherein:

the piston stroke (S) is 1.125 inches;
the center-to-center distance between fulcrums 19 (or 20) to 21 is 1.5 inches;
the center-to-center distance between the fulcrums 15 and 19 (or 16 and 20) is 1.5 inches;
the distance within the jaw 13 (or 14) between the center of fulcrum 15 (or 16) and force center C on the corresponding die part is 1.285 inches; the offset of hinge axis 15 (or 16) from the line (projected) of movement of the fulcrum 21 is 0.906 inch;
the pressures (P) and the resulting forces ($F_p$ on the piston; $F_c$ on the force center of one die part) at successive increments ($S_i$) of the piston stroke are as shown in the following table:

|  | $S_i$ (inches) | P (p.s.i.) | $F_p$ (pounds) | $F_c$ (pounds) |
|---|---|---|---|---|
| Z (degrees): |  |  |  |  |
| 44°55′ | .000 | 96 | 342 | 200 |
| 38°50′ | .100 | 69 | 245 | 200 |
| 34°30′ | .200 | 59 | 209 | 200 |
| 30°20′ | .300 | 50 | 179 | 200 |
| 26°40′ | .400 | 210 | 742 | 950 |
| 23° | .500 | 398 | 1,410 | 2,100 |
| 19° | .600 | 800 | 2,840 | 5,100 |
| 15°40′ | .700 | 930 | 3,310 | 7,350 |
| 12° | .800 | 950 | 3,380 | 8,350 |
| 8°40′ | .900 | 1,090 | 3,870 | 10,150 |
| 5°40′ | 1.000 | 575 | 2,050 | 11,250 |
| 0° | 1,125 | 500 | 1,780 | ∞ |

The point in the piston stroke at which the blocking valve 50 closed to cut off further inflow of compressed gas to the cylinder was between Z angles of 8°30′ and 5°40′. Thus, further movement of the piston after blocking valve 50 closed is a result of expansion of the gas confined within cylinder 3. Such expansion is attended by a reduction in pressure, and by a corresponding reduction of the force exerted by the confined gas on the piston, but such reduction of force applied to the piston is compensated for by incorporating in the tool a mechanical advantage means, such as the linkage above described, whose mechanical advantage geometrically increases during the latter part of the piston stroke. While the most efficient location of the position in the piston stroke whereat the input gas should be cut off varies with the size, shape, hardness and ductility of the fitting to be applied; a practical criterion, with a factor of safety, for the maximum force requirements of tools which are to be used with a variety of fittings, is to fix the length of stem 51 so that its end 52 loses contact with the surface of piston 3 (and blocking valve 50 closes) after the lines of thrust between the piston rod and the respective jaws (i.e., the center-to-center line between fulcrum 21 to pin 19 or 20) have become tangent with the arc through which the jaw-end (e.g., 19) of that thrust line moves about its hinge axis (e.g., 15), yet before such lines of thrust have come within 5° of being perpendicular to the path of movement of the mutual fulcrum 21.

An alternative form of mechanical advantage means, which may be substituted for the linkage system hereinbefore described, is shown in FIGURE 13. In this embodiment, the jaws 130 and 140 correspond to the jaws 13 and 14, respectively, of the previous embodiment, and are mounted upon hinge axes 15 and 16 as previously, but the lower extremities of such jaws are of somewhat different configuration. The mechanical advantage means of this embodiment includes a cam 210, having oppositely sloped surfaces 171 and 181 for cooperating, respectively, with follower rollers 190 and 200. The slope of surfaces 171 and 181 is designed to produce the same geometrical progression of mechanical advantage, as piston rod 6 moves upwardly toward the end of its stroke, as that which was produced by the linkage previously described. In order to cause the jaws 130 and 140 to move into their open position shown, when piston rod 6 is retracted upon exhaustion of the gases from cylinder 3, the followers 190 and 200 may be connected by a tension spring 201, or, as an alternative, the cam 210 may be grooved to provide cam surfaces, in parallel spaced relationship to the respective surfaces 171 and 181, which make contact with followers 190 and 200 diametrically opposite the sides thereof which are engaged by surfaces 171 and 181.

If desired, the tool may be provided with any suitable means for adjusting the position of sleeve 53 axially of sub-chamber 49, so that the operator may, by external manipulation of an adjusting device, so position the sleeve 53, in accordance with the demands of the job immediately at hand, that maximum economy of pressurized gas can be effected for each different connector upon which the tool is used.

In order to protect the finger button 43 from unintentional movement to its open position when the tool is not in use, an annular shield 56 is provided in a circumferential raceway 57 which embraces the body 1 at the region of button 43. In the form illustrated, the shield 56 is a plastic ring made with a gap, so that it may be sprung open to be fitted into the raceway 57 and rotated about the longitudinal axis of the tool, so that button 43 may be exposed at the gap, or concealed by moving the gap circumferentially about the tool. If desired, the raceway 57 may have a spring detent which, when released at the gap in ring 56, prevents accidental rotational movement thereof.

In FIGURE 14, the tool of FIGURES 1 and 8–12 is shown mounted upon a hot stick 58 having a telescopically related handle portion 59 at its lower end, and a clamp 60 at its upper end. The clamp 60 is connected to the upper end of the hot stick through fitting 66 which is fixed to the hot stick in any suitable way, and provided with tubular shaft 67 having a head at one end and external threads at the other end. The clamp 60 is mounted on the head end of shaft 67 so as to swivel thereabout when nuts 68 are relaxed, but when nuts 68 are tightened, the clamp 60 is held in any chosen orientation relative to the axis of shaft 67. The clamp 60 is adapted to embrace body 1 below (i.e., toward canister 26) shield 56, and to retain the tool against movement relative to the hot stick. In positioning the clamp 60 on the tool, button 43 is aligned with a pin 61 (which is coaxial with shaft 67) while shield 56 is in position to expose the button. Pin 61 is biased inwardly by a spring 62, so that the head 63 of the pin is maintained in contact with an inclined plane surface 64 at the end of a bar 65, the lower end of which is connected with handle 59. Consequently, when the tool is positioned upon the hot stick, and the jaws have been brought into the relationship with a live conductor so as to apply a connection fitting thereto, the tool can be actuated by moving the handle portion 59 telescopically relative to hot stick 58, thereby driving bar 65 upwardly and moving pin 61 outwardly to depress button 43 precisely as it would by a human finger in the absence of the hot stick.

While, in the drawings, the tool of the invention has been shown with the compressed-gas-containing canister 26 annexed as an integral part of the tool, it will be understood that while such is normally a convenience, there are situations where the tool may be operated in close quarters, or otherwise, in which the length of the tool plus canister is unhandy. In the latter situations, the canister can be located remotely, equipped with a flexible conduit, the free end of which is equipped with a valved fitting like 27, which is connectible to the body of the tool in exactly the same manner, and with the same result, as that previously described where the canister is, in effect, an integral part of the tool.

While, in the foregoing description, one complete embodiment of the invention has been disclosed in detail, and certain alternatives indicated, it is not to be understood that the invention is limited to the details specifically disclosed. On the contrary, it is recognized that various modifications in detail will occur to those skilled in the art without departing from the spirit of the invention. Consequently, the foregoing disclosure is intended to be merely illustrative, and the invention is not limited to the forms disclosed save as indicated by the appended claims.

Having thus described the invention, what is claimed and desired to be secured by Letters Patent is:

1. A tool for compressing ductile connectors about electrical conductors comprising,
   (1) a pair of jaws movable relative to each other between an open position for the reception of a fitting and a closed position whereat the fitting is fully compressed about said conductors;
   (2) a pair of toggle links in force-transmitting relationship with the respective jaws and having a mutual fulcrum;
   (3) piston-cylinder combination having a piston rod connected to said mutual fulcrum, said piston having a stroke whose extremes correspond respectively with the open and closed position of said jaws;
   (4) a source of compressed gas;
   (5) means connecting said source to said piston-cylinder combination for moving said piston rod relative to said jaws;
   (6) a valve controlling flow of compressed gas through said means (5);
   (7) and means automatically closing said valve while said piston is between the extremes of its stroke.

2. The tool of claim 1 having mechanical advantage means including said toggle links for increasing the mechanical advantage between said piston and said jaws after said valve is closed.

3. In a fluid pressure-energized tool for compressing a ductile connector about electrical conductors, said tool having a piston-cylinder combination wherein the piston is moved in its power stroke from one end of the cylinder toward the other by the admission of pressurized fluid into the cylinder at one side of the piston, the combination of: a canister charged with gas under pressure of between 100 and 200 atmospheres, means for controlling the flow of gas from said canister to said piston-cylinder combination, and mechanical advantage means between said ductile connector and said piston for increasing the ratio:

$$\frac{\text{force applied to ductile connector}}{\text{force applied to piston}}$$

as the piston approaches the end of its power stroke.

4. The tool of claim 3 in which the gas is nitrogen and the increase in said ratio is by geometric progression.

5. The tool of claim 3 in which said means for controlling the flow of gas from said canister to said piston-cylinder combination is controlled by the movement of the piston during its power stroke.

6. The tool of claim 5 wherein said means is actuated to its closed position substantially before the piston reaches the end of its power stroke.

7. The tool of claim 3 wherein said means is a differential valve having a minor surface area within the cylinder and a major surface area exposed to canister pressure.

8. The tool of claim 3 wherein the canister has a valve normally held closed by the canister pressure, and means permanently connected with the cylinder for automatically opening said canister valve when the canister is connected to the tool.

9. The tool of claim 8 wherein the tool has a normally closed manually operable valve between said canister valve and said piston-cylinder combination.

10. A tool for compressing ductile connectors about electrical conductors comprising, (1) a pair of jaws movable relative to each other between an open position for the reception of a fitting and a closed position whereat the fitting is fully compressed about said conductors,
(2) piston-cylinder combination having a piston rod,
(3) a source of compressed gas,
(4) means connecting said source to said piston-cylinder combination for moving said piston rod relative to said jaws,
(5) force-transmitting means having changing mechanical advantage relationship between the respective jaws and said piston rod,
(6) a valve controlling flow of compressed gas through said means (4),
(7) and means closing said valve when said force-transmitting means has reached an orientation such that its mechanical advantage relative to said jaws has exceeded a value at which the compressed gas there held captive in the cylinder has sufficient residual energy to move the jaws to their closed position.

References Cited

UNITED STATES PATENTS 2,693,218 11/1954 Freedom _____ 140—113
2,766,631 10/1956 Van Sittert _____ 140—113
3,024,936 3/1962 Logue _____ 220—3

CHARLES W. LANHAM, Primary Examiner

L. A. LARSON, Assistant Examiner

U.S. Cl. X.R.

29—282, 518